United States Patent
Stavely et al.

(10) Patent No.: US 8,063,940 B2
(45) Date of Patent: Nov. 22, 2011

(54) IMAGE-STABILIZATION SYSTEMS AND METHODS

(75) Inventors: Donald J. Stavely, Windsor, CO (US);
Christopher A. Whitman, Ft. Collins, CO (US); Gregory V. Hofer, Loveland, CO (US); David K. Campbell, Loveland, CO (US); Jason E. Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1430 days.

(21) Appl. No.: 10/842,223

(22) Filed: May 10, 2004

(65) Prior Publication Data
US 2005/0248661 A1 Nov. 10, 2005

(51) Int. Cl.
*H04N 5/228* (2006.01)
(52) U.S. Cl. ............ 348/208.99; 348/208.7; 348/208.11
(58) Field of Classification Search ............ 348/208.99, 348/208.11, 208.7, 208.2
See application file for complete search history.

(56) References Cited

U.S. PATENT DOCUMENTS

| | | | | |
|---|---|---|---|---|
| 5,266,988 A | * | 11/1993 | Washisu | 396/55 |
| 5,585,884 A | | 12/1996 | Onuki | |
| 5,589,882 A | * | 12/1996 | Shiraishi et al. | 348/340 |
| 5,592,320 A | * | 1/1997 | Wissinger | 398/121 |
| 5,623,305 A | * | 4/1997 | Ishizuka et al. | 348/208.8 |
| 5,634,142 A | * | 5/1997 | Imafuji et al. | 396/52 |
| 5,781,806 A | * | 7/1998 | Satoh et al. | 396/55 |
| 5,831,671 A | * | 11/1998 | Chigira et al. | 348/208.8 |
| 5,990,943 A | * | 11/1999 | Yamazaki | 348/208.8 |
| 6,043,922 A | * | 3/2000 | Koga et al. | 398/213 |
| 6,429,895 B1 | | 8/2002 | Onuki | |
| 6,614,462 B1 | * | 9/2003 | Donner et al. | 347/239 |
| 6,753,906 B2 | * | 6/2004 | Shimada | 348/219.1 |
| 7,136,104 B2 | * | 11/2006 | Fuchimukai | 348/342 |
| 2006/0072018 A1 | * | 4/2006 | Inaba et al. | 348/208.99 |

FOREIGN PATENT DOCUMENTS

| | | |
|---|---|---|
| JP | 6-46314 | 2/1994 |
| JP | 7234429 | 9/1995 |
| JP | 10191147 | 7/1998 |
| JP | 11337796 | 12/1999 |

* cited by examiner

*Primary Examiner* — Luong T Nguyen (57) ABSTRACT

Image stabilization systems and methods are disclosed. One embodiment of the image stabilization method, among others, includes detecting motion of a camera, and responsive to the detected motion, changing an optical filter orientation to displace an image provided on a sensor.

33 Claims, 7 Drawing Sheets

IMAGE-STABILIZATION SYSTEMS AND METHODS

BACKGROUND

Cameras are often limited in their ability to produce sharp pictures by how steadily they can be held by the user. When a camera shutter remains open for an extended period of time, motion occurring during this open interval is visible in a snapshot. The visibility of the motion as a result of the combination of open shutter and motion is referred to as motion blur. Sometimes the introduction of motion blur into a captured image is purposeful, such as to capture the perceptual effect of high-speed motion more accurately or to provide a particular artistic effect. But for the photographer that desires a crisp picture, motion blur caused by "camera shake" presents an obstacle to that goal. Camera shake is primarily the result of rotational (e.g., pitch and yaw) motion of the camera.

Camera shake can be a limiting factor for exposure time, especially at longer focal lengths. Longer focal lengths magnify the image, and thus the perceived shake due to rotational motion is also magnified. A rule of thumb from 35 mm (millimeter) film photography is that, to avoid blur that results from camera shake, hand-held exposure times are selected to be less than the inverse of the focal length. For example, at a 60 mm focal length, the exposure should be 1/60 second or less. Considering the rule of thumb, there are various options to reduce motion blur. One option is to use a faster lens, which allows a shorter exposure time for the same scene brightness. Digital cameras typically use the fastest lens that is practical in terms of cost, size and image quality goals. Lens speeds of F/2 to F/2.8 (F referring to the F-stop, which is a calibrated measure of the ratio of a lens maximum aperture to its focal length, the inverse of which is an indication of lens speed) are typical. Faster lenses than this are often significantly more expensive and bulky.

Other approaches have been developed to address motion blur. One popular approach is active image stabilization of the lens system. "Image stabilization" refers to a process that attempts to stabilize an image on an image sensor or on a photographic film during the course of an exposure. In an image-stabilized lens system, a lens or prism disposed within the lens system is moved in such a way that the image path is deflected in the direction opposite the camera motion. The lens or prism is typically driven by two "voice coil" type actuators, which respond to signals generated by gyroscopes or accelerometers that sense rotational motion of the camera. As mentioned above, it is primarily the pitch and yaw motions of the camera that cause the image to move on the sensor. In general, the rotational motion is multiplied by the focal length of the lens, resulting in a shake that is "magnified."

Liquid-filled prisms have been used for image stabilization. Such structures typically include two flat plates that form the front and back surfaces of the prism, surrounded by a flexible seal to hold the liquid in place. Actuators "squeeze" the prism by the edges of the plates, refracting the beam in the direction of the thicker side of the prism to counter image displacement on the sensor.

Moveable lens systems have also been used for image stabilization. In such systems, actuators shift the lens laterally, "decentering" the image provided on an image sensor horizontally and vertically. The beam is deflected proportionally to the power of the lens (positive or negative).

One problem with the image stabilization approaches described above concerns the limited space available within the lens system. For example, the moveable lens is typically located at or near the aperture stop of the lens system, which is a very "crowded" area in a camera, especially in compact zoom lens system designs. Additionally, the liquid prism approach is implemented using a separate, additional element to the standard lens system. Thus, the prism generally has to be fitted into the optical path. Further, lenses for these approaches are often specially designed to accommodate image stabilization, making them bulky, costly to fabricate, and complex in operation.

Another approach to image stabilization is leaving the lens intact and moving the image sensor. The image sensor may be fixed to a stage that is moveable in the x- and y-direction. The image sensor can be shifted by actuators in response to sensed motion, matching the movement of the image. One problem with this approach is that motion in the z-direction and in its tilt direction must be very carefully controlled, otherwise the image will not remain in focus. For example, out-of-plane motions of as little as 10 micrometers may cause some or all of the image to lose focus. An additional problem concerns movement of the sensor and the need for flexibly connecting the large number of signal lines from the camera control circuitry to the sensor.

SUMMARY

One embodiment may comprise an image-stabilization method, comprising detecting motion of a camera; and responsive to the detected motion, changing an optical filter orientation to displace an image provided on a sensor.

Another embodiment may comprise an image-stabilization system, comprising a motion sensor configured to detect motion of a camera; an optical filter having an adjustable orientation; and logic configured to receive motion information from the motion sensor and, responsive to the received motion information, effect a change in optical filter orientation.

Another embodiment may comprise an image-stabilization system, comprising means for detecting rotational motion of a camera; and means for adjusting an optical filter orientation responsive to the detected rotational motion such that an image is displaced on a sensor.

Another embodiment may comprise a computer-readable medium having a computer program comprising image-stabilization methods, said program comprising logic configured to receive an indication of camera motion; and logic configured to effect an optical filter orientation based on the indication of camera motion.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of an image-stabilization system and method, herein referred to as an image-stabilization system for brevity. Responsive to detected motion of a digital camera, an image-stabilization system can change the orientation of one or more optical filters to displace an image horizontally and/or vertically on the image sensor. A change in the orientation of an optical filter based on sensed motion can result in a motion-stabilized image on the image sensor. In other words, displacement of the image based on camera motion can be offset by a substantially equal but opposite displacement of the image through suitable deflection of the optical filter.

One or more optical filters typically exist in most digital cameras, and thus the image-stabilization system incorporates many of the existing components of a digital camera. Using existing components may substantially preserve the size, cost, and/or design complexity of a digital camera implemented with the image-stabilization system.

Figure 1:
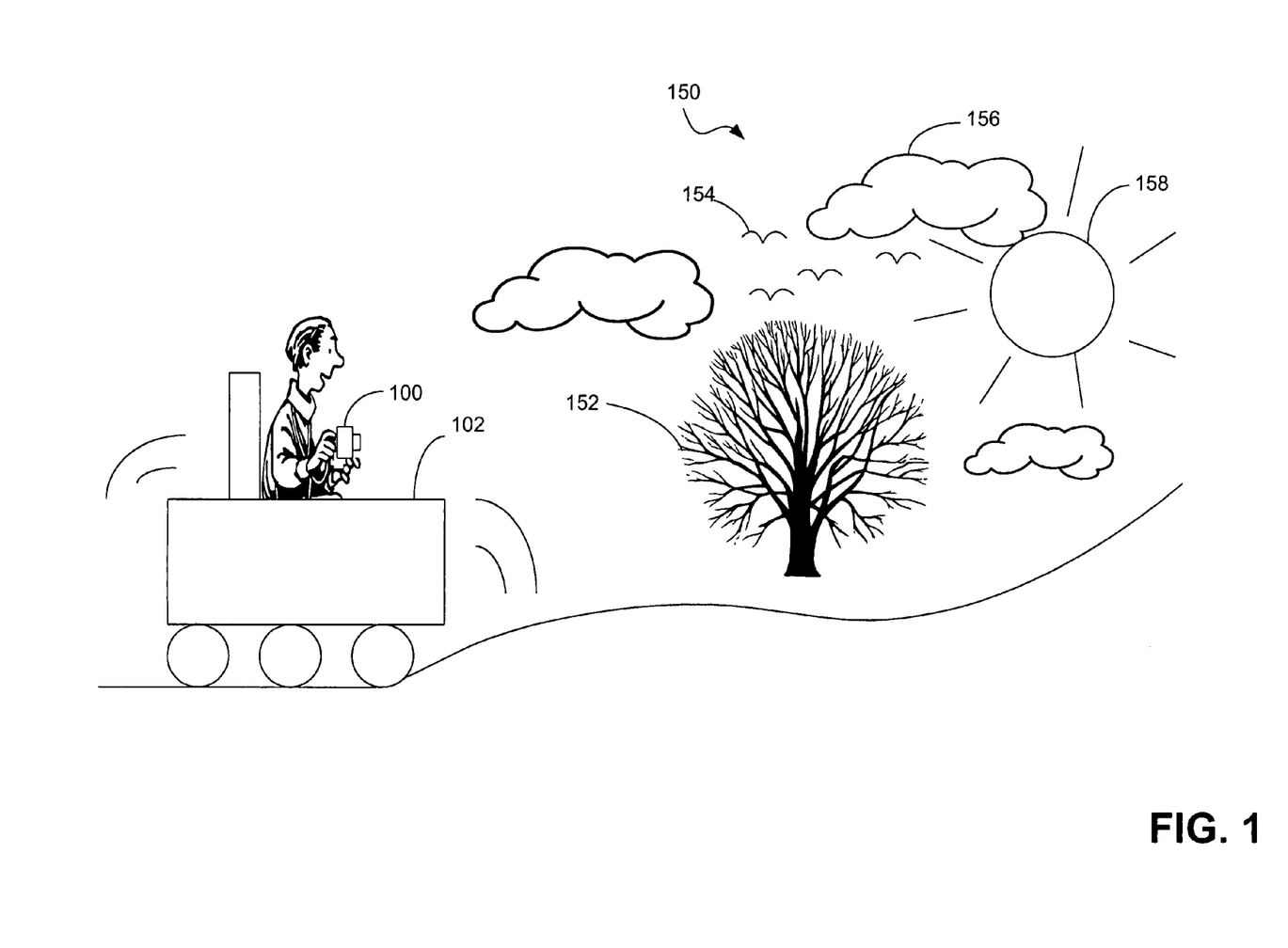
FIG. 1 is a schematic diagram of an example implementation for a digital camera that uses an image-stabilization system.
Figure 2:
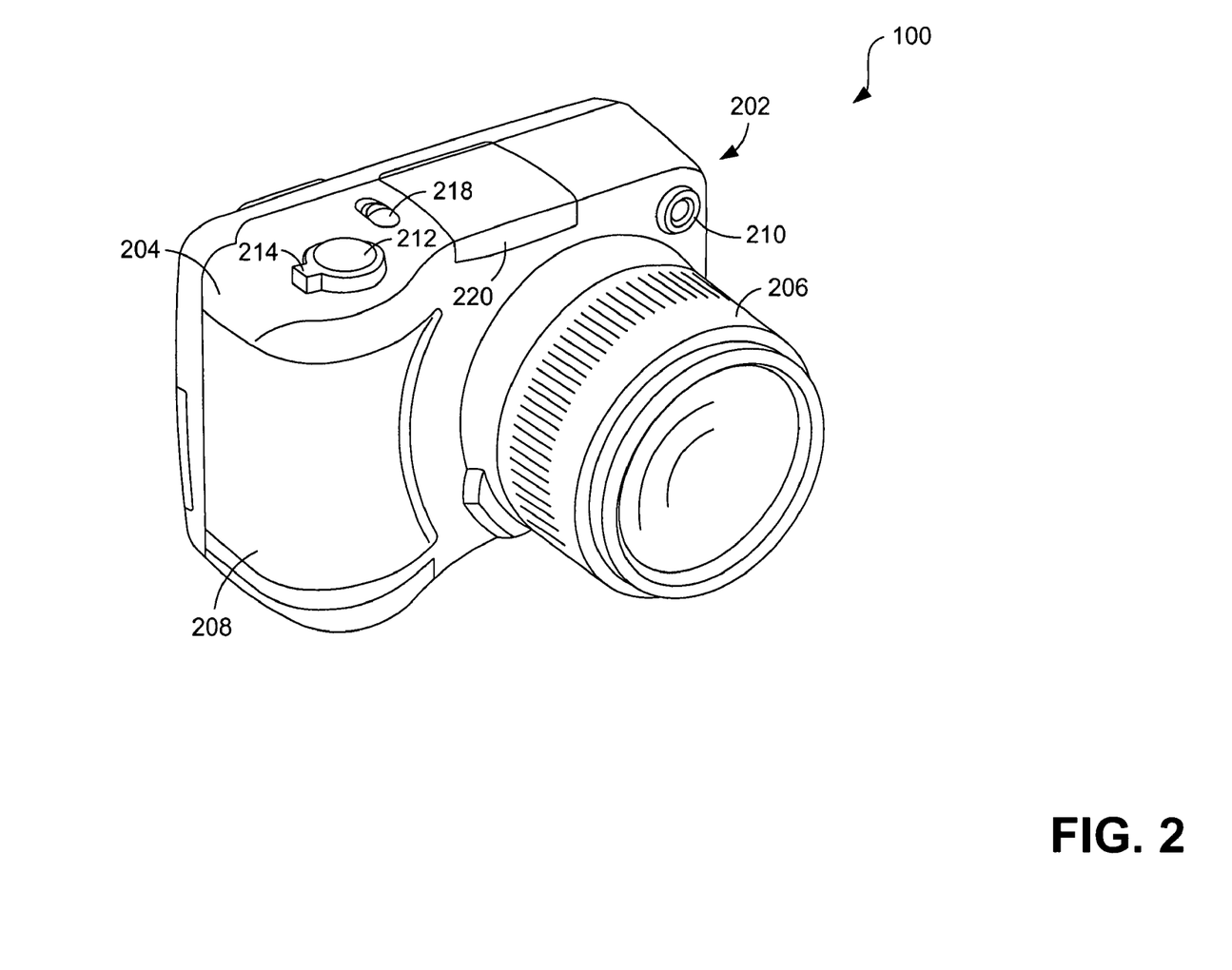
FIG. 2 is a schematic diagram of the example digital camera of FIG. 1.
Figure 3:
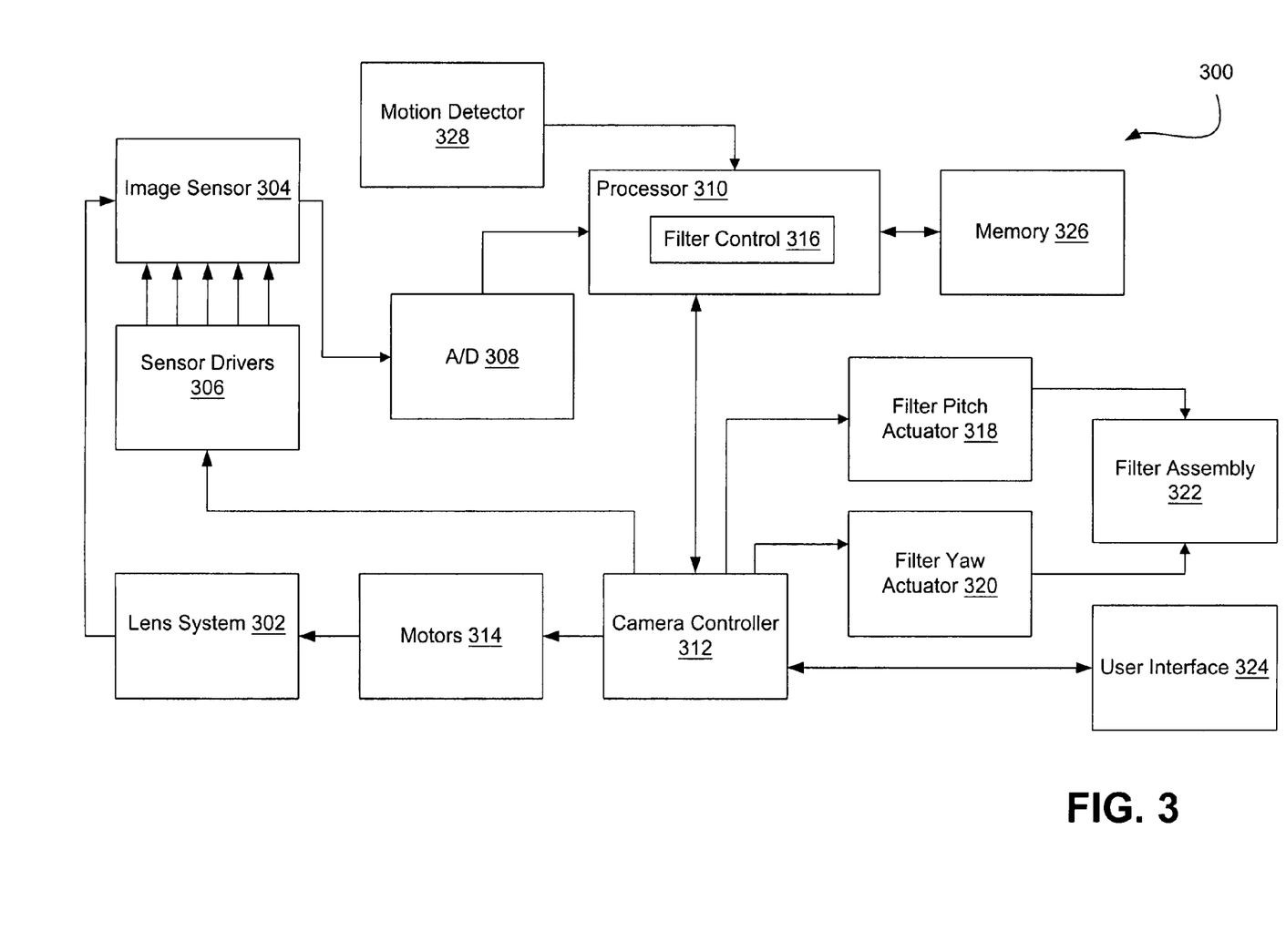
FIG. 3 is a block diagram of an embodiment of an image-stabilization system as implemented in the digital camera of FIG. 2.
Figure 4A:
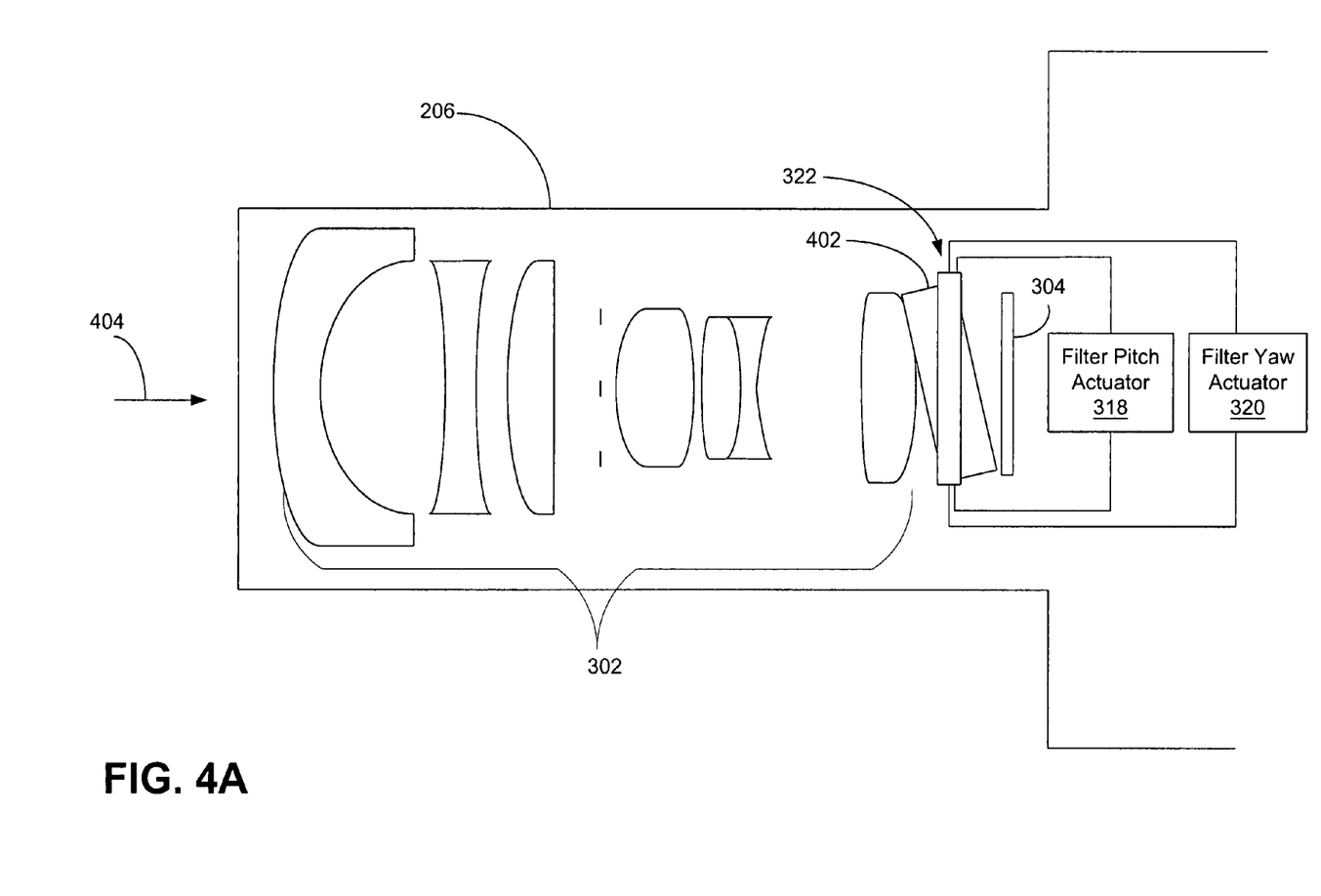
FIG. 4A is a schematic diagram of an example lens system and example components of the image-stabilization system shown in FIG. 3.
Figure 4B:
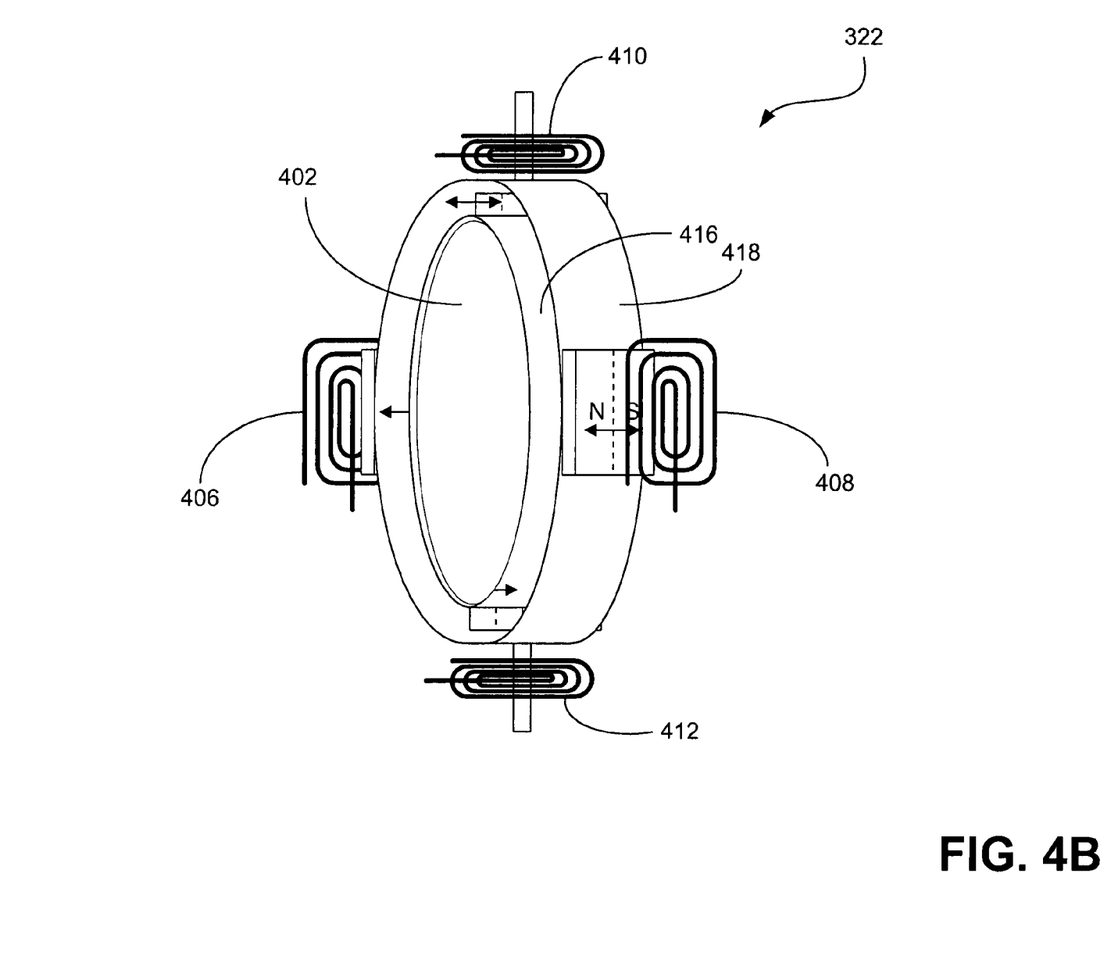
FIG. 4B is a schematic diagram of an embodiment of an optical filter assembly shown in FIG. 4A.
Figure 5:
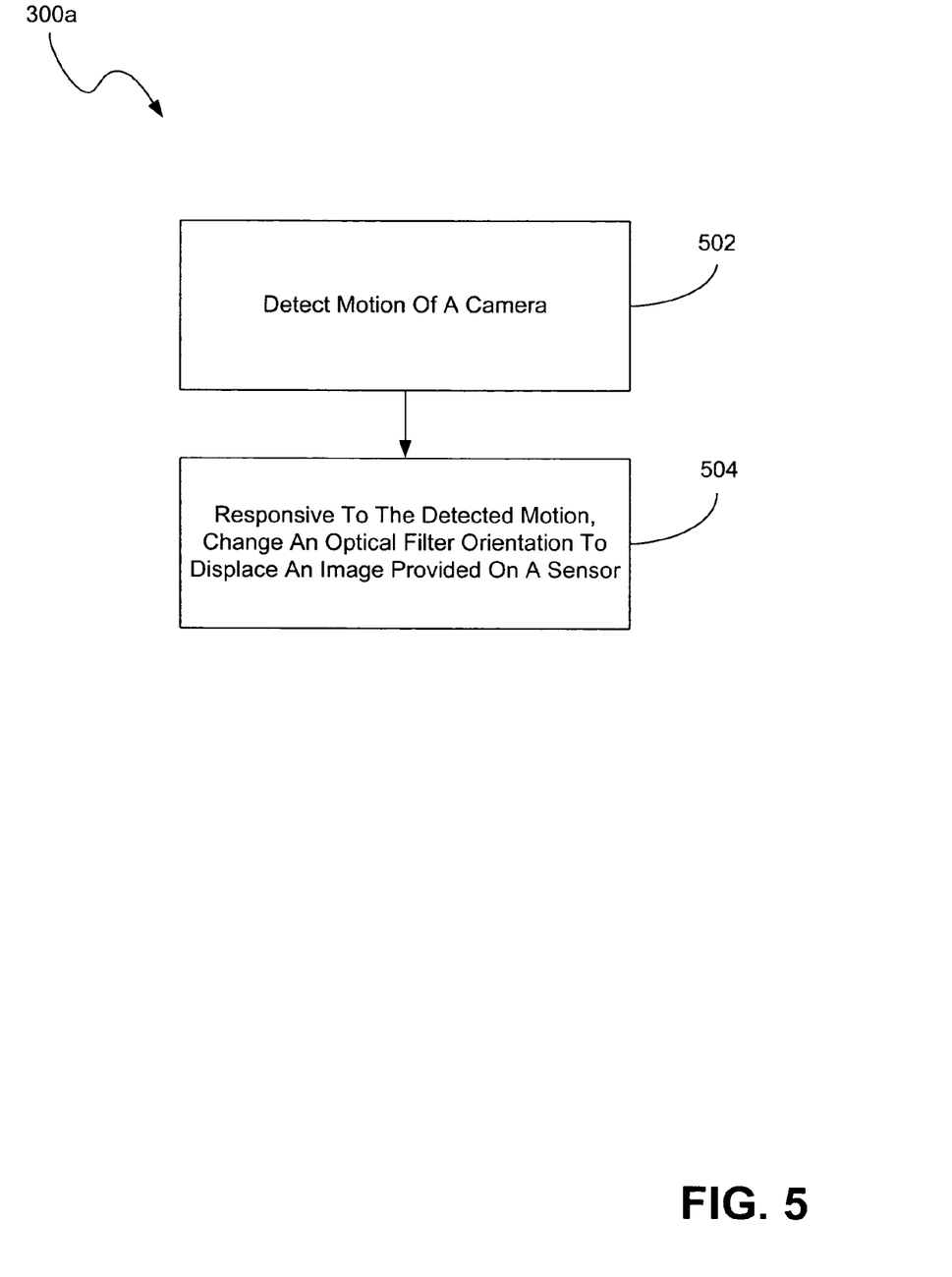
FIG. 5 is a flow diagram that illustrates an embodiment of an image-stabilization method that can be employed by the image-stabilization system shown in FIG. 3.
Figure 6:
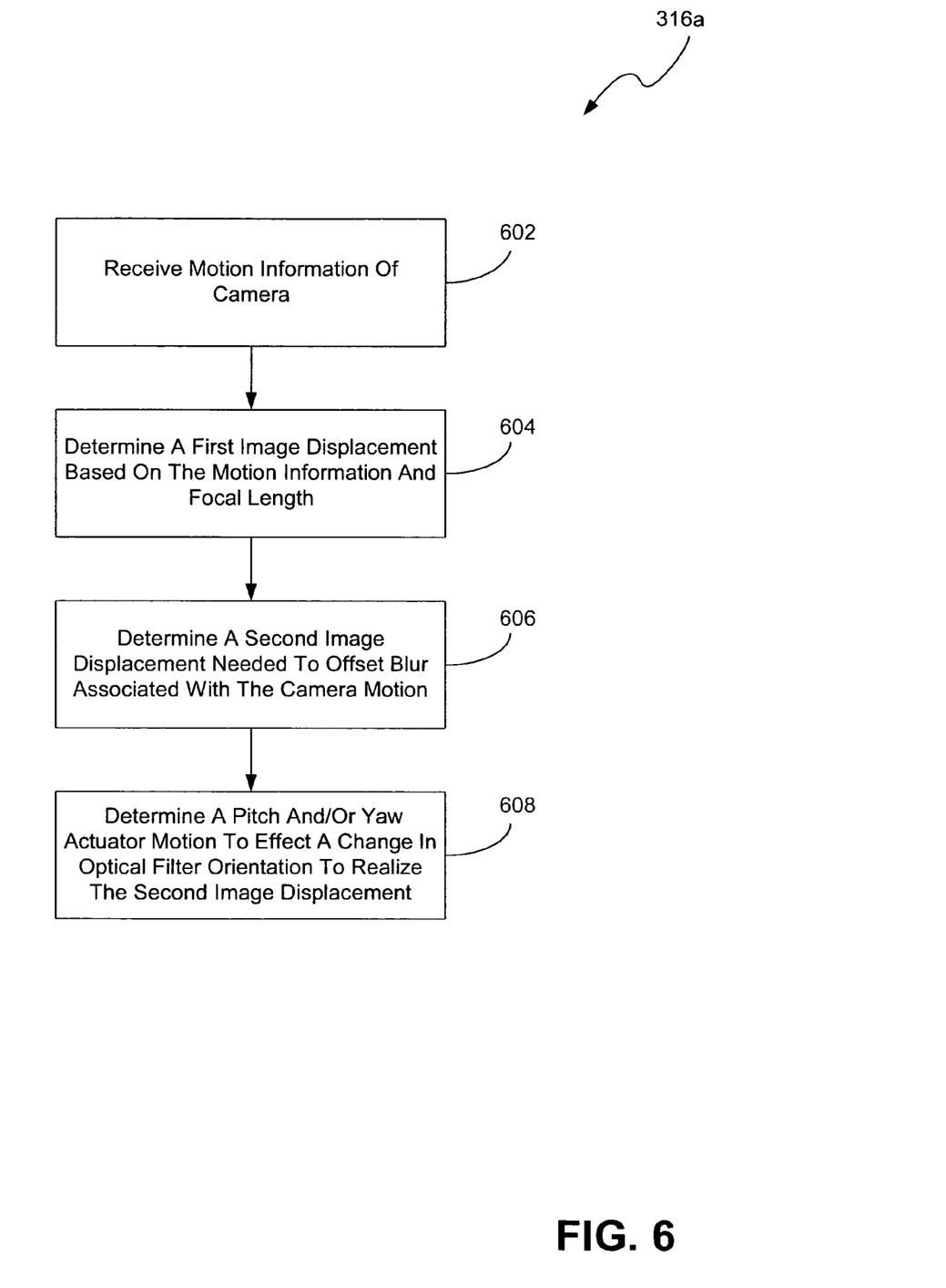
FIG. 6 is a flow diagram that illustrates another embodiment of an image-stabilization method that can be employed by the image-stabilization system shown in FIG. 3.

An example implementation of a digital camera that utilizes an image-stabilization system is shown in FIGS. 1 and 2. FIGS. 3-4B are used to show various components of embodiments of the image-stabilization system. FIGS. 5 and 6 provide an illustration of various embodiments of an image-stabilization method.

FIG. 1 is a schematic diagram of an example implementation for a digital camera that provides an illustration of the type of circumstances that can benefit from image stabilization. A user is travelling in an all-terrain vehicle (ATV) 102 on a bumpy road in pursuit of scenes of interest for taking pictures. The user is taking pictures of an outdoor scene 150 with his digital camera 100 while driving, which increases the likelihood of motion blur. The outdoor scene 150 includes a tree 152, birds 154, clouds 156, and the sun 158. Although an extreme example giving rise to camera shake is shown, it will be understood that camera shake can be a problem (worthy of correction by the image-stabilization system) in more benign situations, such as when a user tries to hand-hold a camera with a long focal length lens on steady ground.

FIG. 2 is a schematic diagram of the example digital camera 100 of FIG. 1. The digital camera 100 includes a body 202 that is encapsulated by an outer housing 204. The body 202 houses an image-stabilization system (not shown). The digital camera 100 further includes a lens barrel 206 that, by way of example, houses a lens system and optical filter assembly (not shown) as described below. Incorporated into the front portion of the camera body 202 is a grip 208 that is used to grasp the camera 100 and a window 210 that, for example, can be used to collect visual information used to automatically set the camera focus, exposure, and white balance.

The top portion of the digital camera 100 is provided with a shutter-release button 212 that is used to open the camera shutter (not visible in FIG. 2). Surrounding the shutter-release button 212 is a ring control 214 that is used to zoom the lens system in and out depending upon the direction in which the control is urged. Adjacent the shutter-release button 212 is a switch 218 that is used to control operation of a pop-up flash 220 (shown in the retracted position) that can be used to illuminate objects in low light conditions.

FIG. 3 is a block diagram of an embodiment of an image-stabilization system 300 as implemented in the example digital camera 100 of FIG. 2. The image-stabilization system 300 includes a lens system 302 that conveys images of viewed scenes to one or more image sensors 304. By way of example, the image sensors 304 comprise charge-coupled devices (CCDs) that are driven by one or more sensor drivers 306. Complementary metal-oxide semiconductor (CMOS) sensors may also be utilized. The analog image signals captured by the sensors 304 are then provided to an analog-to-digital (A/D) converter 308 for conversion into binary code that can be processed by a processor 310.

Operation of the sensor drivers 306 is controlled through a camera controller 312 that is in bi-directional communication with the processor 310. Also controlled through the controller 312 are one or more motors 314 that are used to drive the lens system 302 (e.g., to adjust focus and zoom). Operation of the camera controller 312 may be adjusted through manipulation of the user interface 324. The user interface 324 comprises the various components used to enter selections and commands into the digital camera 100 (FIG. 2) and therefore at least includes the shutter-release button 212 and the ring control 214 identified in FIG. 2.

The digital image signals are processed in accordance with instructions from the camera controller 312 in cooperation with the processor 310 via data fetches (or other known mechanisms, such as direct memory access, etc.) to and/or from memory 326. In some embodiments, the functionality of the camera controller 312 and the processor 310 can be combined in a single component. The memory 326 can include volatile and non-volatile memory that, in one embodiment, can be configured with one or more data structures to associate motion detection information and image displacement information with camera rotational motion and optical filter rotation, respectively, as described below. Processed images may be stored in memory 326, or other memory not shown.

The processor 310 includes, in one embodiment, optical filter control logic 316 that includes embedded instructions to enable the processor 310 to receive information from a motion detector 328. The optical filter control logic 316 processes that information to convert camera rotational motion to offsetting image displacement on the image sensor 304. The motion detector 328 can include one or more accelerometers, gyroscopes, among other motion detecting devices that sense rotational motion. For example, when the digital camera 100 (FIG. 2) tilts (e.g., in the pitch and yaw direction), the image moves on the sensor 304. The amount the image moves on the sensor 304 for a given tilt depends largely on the focal length of the lens system 302. The longer the focal length, the more displacement of the image for a given amount of tilt. The motion detector 328 can measure the tilt and provide this information to the optical filter control logic 316. The optical filter control logic 316 can use the tilt and focal length information to measure the displacement of the image on the sensor 304 such as through an algebraic determination. As is known, the displacement of the image is the tangent of the rotation angle multiplied by the focal length. For small angles, the algebraic determination may simplify to the rotation (e.g., in radians) multiplied by the focal length (e.g., since tan(x) is approximately equal to "x" for small "x"). In some embodiments, memory 326 may include a data structure (e.g., a table) that equates the signal level received from the motion detector 328 to the rotational motion of the digital camera 100 (FIG. 2). The optical filter control logic 316 can use the rotational motion information and focal length of the lens system 302 to determine the desired image displacement on the sensor 304 to reduce or prevent motion blur.

One goal of image stabilization is to displace the image back to "where it belongs" (e.g., the location in the absence of camera shake) on the sensor 304. How much the optical filter (not shown) of an optical filter assembly 322 needs to be rotated to place the image back to the desired position can be determined by the optical filter control logic 316 implementing Snell's law, which provides:

$$Sin(\phi_i) = Sin(\phi_d)/(\text{refractive index}),\qquad [\text{Eq. 1}]$$

where $\phi_i$ represents the angle of incidence of a beam of light impinging on the lens system 302, $\phi_d$ represents the angle of deflection, and the refractive index corresponds to the refractive index of the optical filter.

The optical filter control logic 316 can further instruct the controller 312 to control an optical filter pitch actuator 318 and an optical filter yaw actuator 320 to effect a change in orientation of an optical filter of the optical filter assembly 322. In one embodiment, the instructions can be derived through an algorithmic determination. In some embodiments, memory 326 my include a data structure (e.g., table) that may equate image displacement on the sensor 304 to signal information (e.g., coding or signal levels) to be sent to filter pitch and yaw actuators 318 and 320 to return the image to the desired position on the sensor 304.

The optical filter control logic 316 can be implemented in hardware, software, firmware, or a combination thereof. When implemented in hardware or firmware, the optical filter control logic 31 6 can be implemented with any or a combination of the following technologies: a discrete logic circuit (s) having logic gates for implementing logic functions upon data signals, an application specific integrated circuit (ASIC) having appropriate combinational logic gates, a programmable gate array(s) (PGA), a field programmable gate array (FPGA), etc.

In some embodiments, functionality of the optical filter control logic 316 can be stored as software in memory 326. When the optical filter control logic 316 is implemented in software, the optical filter control logic 316 can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The optical filter control logic 316 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

FIG. 4A is a schematic diagram of various components of the image-stabilization system 300 and the lens system 302 of FIG. 3. The lens system 302 and the optical filter assembly 322 of the image-stabilization system 300 can be housed wholly or in part in the lens barrel 206. The lens system 302 includes various concave and convex lenses and an aperture (represented by the dashed line) that alter the angle of deflection of a beam of light 404 incident to the lens system 302. The lens system 302 can provide focus adjustment, among other functions. Disposed between the lens system 302 and the image sensor 304 is the optical filter assembly 322. The optical filter assembly 322 is coupled to the optical filter pitch actuator 318 and the optical filter yaw actuator 320 to provide pitch and/or yaw displacement, respectively, of an optical filter 402 housed within the optical filter assembly 322.

The optical filter 402 may include an IR (infrared) cut filter and/or a blur filter, which are typically disposed between the lens system 302 and the image sensor 304. The image sensor 304 can include a charge-coupled device (CCD) or CMOS sensor, which often have a color-filter array (e.g., red-green-blue) disposed on it. Such filters can be dye-based, thus allowing IR light to pass through. The IR light is filtered out by an IR filter, allowing predominantly visible light to impinge on the image sensor 304 to provide visible light color images. A blur filter is often implemented to provide a small amount of blurring of the image to eliminate or reduce color aliasing artifacts. Such artifacts can result from using a mosaic filter on a CCD or CMOS sensor.

When the optical filter 402 is configured as a flat-plate, a beam of light 404 incident orthogonally to the optical filter 402 passes through the filter with negligible deflection. Orienting the optical filter 402 to receive the beam of light 404 at other than an orthogonal incidence deflects the beam 404 at an angle dictated by Snell's law. According to Snell's law, the amount of deflection is determined by the angle of the optical filter 402 in relation to the incident beam 404, the thickness of the optical filter 402, and the refractive index of the optical filter material. In the image-stabilization system 300 (FIG. 3), the optical filter 402 is mounted in a manner to allow a change in orientation (e.g., tilting) in pitch and/or yaw directions to displace the image provided on the sensor 304 in a manner that offsets the image displacement due to the motion of the camera 100 (FIG. 2).

In one embodiment, the optical filter 402 can be tilted +/−13 degrees, resulting in an image displacement of +/−150 μm (micrometers), or about +/−50 pixels on a typical modem CCD sensor. This is sufficient to eliminate or significantly reduce motion blur on long exposures at long focal lengths.

FIG. 4B provides an illustration of an embodiment of the optical filter assembly 322 shown in FIG. 4A. The optical filter assembly 322 is configured in a gimble arrangement, although other configurations are possible. The optical filter assembly 322 includes coils 406 and 408 that are receptive to signals (e.g., current) from the controller 312 (FIG. 3). The flow of current through the coils 406 and 408 provides a magnetic force (as represented by the "N" and "S" symbols) that causes pitch motion according to well-known effects exemplified by Ampere's law. Coils 410 and 412 are receptive to signals from the controller 312 to provide yaw motion in a similar manner. The optical filter 402 housed in the optical filter assembly 322 can be configured in one of many geometric shapes, and is shown in FIG. 4B as having a round shape. The optical filter 402 can be attached in any known manner to an inner ring 416 that is rotatable in a yaw motion. An outer ring 418 can be attached to the inner ring 416 to enable pitch rotation of the inner ring 416 (and hence pitch rotation of the optical filter 402). Actuation of coils 406, 408 and/or 410, 412 can be implemented using a switching action as implemented by the controller 312, by modulating voltage or current to the coils, or via other mechanisms as would be understood by one having ordinary skill in the art. Other actuators can be used, including voice-coil type actuators.

In view of the above description, it will be appreciated that one embodiment of a generalized image-stabilization method 300a may comprise detecting motion of a camera (step 502) and, responsive to detecting motion, changing an optical filter orientation to displace an image provided on an image sensor (step 504). One effect of this operation is to reduce (or eliminate) motion blur.

FIG. 6 illustrates an embodiment of an image-stabilization method 316a that can be implemented by the optical filter control logic 316 (FIG. 3). Step 602 includes receiving motion information of the digital camera 100 (FIG. 2). Although the motion information of interest is primarily pitch and yaw information, other motion information (e.g., linear motion) may be used in some embodiments. Step 604 includes determining a first image displacement based on the motion information and the focal length of the lens system 302 (FIG. 3). Step 606 includes determining a second image displacement needed to offset the blur associated with the camera motion. Step 608 includes determining a pitch and/or yaw actuator motion to effect a change in optical filter orientation to realize the second image displacement.

Process descriptions or blocks in the flow diagrams of FIGS. 5 and 6 should be understood as representing modules, segments, or portions of code which include one or more executable instructions for implementing specific logical functions or steps in the process, and alternate implementations are included within the scope of the embodiments described herein in which functions may be omitted, added to, and/or executed out of order from that shown or discussed, including substantially concurrently or in reverse order, depending on the functionality involved, as would be understood by those reasonably skilled in the art.

What is claimed:

1. An image stabilization method, comprising:
   detecting motion of a camera;
   measuring a displacement of an image provided on a sensor using the detected motion and focal length information of a lens system using an optical filter control logic; and
   changing an orientation of a flat-plate optical filter to displace the image provided on the sensor based on the measurement, the flat-plate optical filter being included in an optical filter assembly disposed substantially between the sensor and the lens system, the optical filter assembly being configured to include actuators, coils, and the flat-plate optical filter.

2. The method of claim 1, wherein the changing includes changing the flat-plate optical filter orientation enough to reduce motion blur in the image.

3. The method of claim 1, wherein the detecting includes detecting rotational motion of the camera.

4. The method of claim 3, further including determining a first image displacement on the sensor resulting from the rotational motion.

5. The method of claim 4, further including determining the image displacement on the sensor to offset the first image displacement.

6. The method of claim 1, wherein changing includes effecting pitch and yaw motion of the flat-plate optical filter.

7. An image stabilization system, comprising:
   a motion sensor configured to detect motion of a camera;
   a flat-plate optical filter having an adjustable orientation, the flat-plate optical filter being included in an optical filter assembly disposed substantially between at least one image sensor and a lens system, the optical filter assembly being configured to include actuators, coils, and the flat-plate optical filter; and
   an optical filter control logic configured to receive motion information from the motion sensor and, responsive to the received motion information and focal length information of the lens system, measure a displacement of an image provided on the at least one image sensor and effect a change in the adjustable orientation of the flat-plate optical filter to displace the image provided on the at least one image sensor.

8. The system of claim 7, wherein the motion sensor is configured to sense pitch and yaw motion of the camera.

9. The system of claim 7, wherein the flat-plate optical filter assembly is coupled to the flat-plate optical filter that enables rotational motion of the optical filter.

10. The system of claim 7, wherein the logic is configured to effect a change in flat-plate optical filter orientation to reduce motion blur in an image.

11. The system of claim 7, wherein the optical filter control logic is configured to effect a change in flat-plate optical filter orientation to offset a first image displacement on the at least one image sensor resulting from the camera motion.

12. The system of claim 7, wherein the optical filter control logic is configured to determine a first image displacement on an image sensor based on focal length and the detected camera motion.

13. The system of claim 12, wherein the optical filter control logic is configured to determine a second image displacement on the at least one image sensor to offset the first image displacement.

14. The system of claim 7, wherein the optical filter control logic is configured in hardware.

15. The system of claim 7, wherein the optical filter control logic is configured in software.

16. The system of claim 7, wherein the flat-plate optical filter includes a blur filter.

17. The system of claim 7, wherein the flat-plate optical filter includes an infrared filter.

18. An image stabilization system, comprising:
   means for detecting rotational motion of a camera;
   means for measuring a displacement of an image provided on a sensor using the detected motion and focal length information of a lens system; and
   means in an optical filter assembly for adjusting an orientation of a flat-plate optical filter included in the optical filter assembly based on the measurement such that the image is displaced on the sensor, the optical filter assembly being disposed substantially between the sensor and the lens system, the optical filter assembly being configured to include actuators, coils, and the flat-plate optical filter.

19. A non-transitory computer-readable medium having a computer program comprising image stabilization methods, said program comprising:
   a first logic configured to receive an indication of camera motion;
   a second logic configured to measure a displacement of an image provided on at least one image sensor using the camera motion and focal length information of a lens system; and
   a third logic configured to effect a change in an orientation of a flat-plate optical filter included in an optical filter assembly, the change in the orientation based on the measurement, the optical filter assembly being disposed substantially between the at least one image sensor and the lens system, the optical filter assembly being configured to include actuators, coils, and the flat-plate optical filter.

20. The non-transitory computer-readable medium of claim 19, further including a fourth logic configured to implement Snell's law to determine image displacement on the at least one image sensor.

21. The non-transitory computer-readable medium of claim 19, further including a fifth logic configured to convert signal levels from a motion detector to rotational motion of a camera.

22. The non-transitory computer-readable medium of claim 19, further including logic configured to convert the image displacement on the at least one image sensor to signal levels to effect pitch and yaw motion of the flat-plate optical filter.

23. The method of claim 1, wherein, in changing the orientation, the optical filter assembly is configured in a gimble arrangement.

24. The method of claim 1, wherein, in changing the orientation, a change in the orientation of the flat-plate optical filter is adjustable to offset a displacement of the image caused due to the motion of the camera.

25. The method of claim 1, wherein changing the orientation comprises changing a tilt of the flat-plate optical filter relative to an axis of the lens system.

26. The method of claim 1, wherein, in changing the orientation, a change in the orientation of the flat-plate optical filter is determined as a function of an angle of the flat-plate optical filter in relation to an incident beam of light from the lens system, thickness of the flat-plate optical filter, and refractive index of the flat-plate optical filter.

27. The system of claim 7, wherein the change in the adjustable orientation of the flat-plate optical filter is determined as a function of an angle of the flat-plate optical filter in relation to an incident beam of light from the lens system, thickness of the flat-plate optical filter, and refractive index of the flat-plate optical filter.

28. The image stabilization system of claim 18, wherein the orientation of a flat-plate optical filter is adjustable as a function of an angle of the flat-plate optical filter in relation to an incident beam of light from the lens system, thickness of the flat-plate optical filter, and refractive index of the flat-plate optical filter.

29. The non-transitory computer-readable medium of claim 19, wherein the change in the orientation of the flat-plate optical filter is determined as a function of an angle of the flat-plate optical filter in relation to an incident beam of light from the lens system, thickness of the flat-plate optical filter, and refractive index of the flat-plate optical filter.

30. The method of claim 1, wherein the flat-plate optical filter can be tilted ±13 degrees, resulting in an image displacement of ±150 micrometers.

31. The system of claim 7, wherein the flat-plate optical filter can be tilted ±13 degrees, resulting in an image displacement off ±150 micrometers.

32. The image stabilization system of claim 18, wherein the flat-plate optical filter can be tilted ±13 degrees, resulting in an image displacement of ±150 micrometers.

33. The non-transitory computer-readable medium of claim 19, wherein the flat-plate optical filter can be tilted ±13 degrees, resulting in an image displacement of ±150 micrometers.

* * * * *

UNITED STATES PATENT AND TRADEMARK OFFICE
CERTIFICATE OF CORRECTION

PATENT NO. : 8,063,940 B2
APPLICATION NO. : 10/842223
DATED : November 22, 2011
INVENTOR(S) : Donald J. Stavely et al.

Page 1 of 1

It is certified that error appears in the above-identified patent and that said Letters Patent is hereby corrected as shown below:

In column 10, line 18, in Claim 31, delete "off" and insert -- of --, therefor.

Signed and Sealed this
Twenty-fifth Day of September, 2012

David J. Kappos
*Director of the United States Patent and Trademark Office*